Patented May 18, 1926.

1,585,184

UNITED STATES PATENT OFFICE.

CHARLES F. CHRISTIAN, OF WALDPORT, OREGON, ASSIGNOR TO ARGUS PRODUCTS COMPANY, OF PORTLAND, OREGON, A CORPORATION OF OREGON.

ARTIFICIAL STONE AND METHOD OF MAKING THE SAME.

No Drawing.    Application filed January 3, 1924, Serial No. 684,259. Renewed March 13, 1926.

This invention relates to the production of artificial stone, and particularly to artificial stone which contains sand, gravel or other aggregate, unslacked limestone, magnesite or oxide of magnesium, and magnesium chloride as components.

Artificial stone having the components mentioned above is old and well known and has been used in the production of many articles, but there are many objections to its use. One of the objections is that it absorbs moisture, another that while it may be colored by pigments this color will not be retained but will change or fade and, on the other hand, articles formed of these components become stained very readily. Artificial stone constructed as above stated is furthermore brittle and when in slabs will warp under heat and cold and does not have a smooth, impervious surface, nor can it resist great crushing strains or a high degree of heat.

The general object of my invention is to provide an artificial stone which does not have any of these bad qualities but which, on the contrary, may be readily colored and retain its color, is highly refractory, can stand great crushing strains, will not warp under intense heat, may be readily molded, and is water-proof.

A further object is to provide an artificial stone of this character which has a high insulating power and may be used for switchboards and bases for the support of electrical apparatus and which, because of its non-conductivity and its resistance to a high degree of heat, may be also used for the production of such articles as spark plugs.

A still further object is to provide an artificial stone which not only will have high resistance to heat but which will be very strong and resist heavy crushing or breaking strains and which will resist the penetration of moisture.

Another object is to provide a method of making artificial stone such that in the production of the stone itself the mass from which the stone is formed will become baked at a relatively high degree of heat.

Other objects will appear in the course of the following description.

In order to form my improved artificial stone, I take finely ground lime rock, finely ground or powdered magnesite (oxide of magnesium), pulverized sulphur, and sand, stones, pebbles, gravel or even ordinary earth, and mix thoroughly together preferably in a mechanical mixing machine. Before, or while these ingredients are being mixed, I add to the mass a small amount of oil, either animal, vegetable or mineral. The amount of the oil added depends upon the amount of liquid which has to be eventually used to bring the composition to a proper consistency. When the mass has been thoroughly mixed, I pour into the mass a solution of magnesium chloride in water. The magnesium chloride is diluted with water to a certain predetermined specific gravity, the specific gravity of the liquid depending on the purpose of the article being made and the material used in making the article. This liquid is intimately mixed with the ingredients before stated and the amount of the liquid is such that the resultant mass has preferably the consistency of syrup or thin batter. When this consistency has been attained this semi-fluid mass is poured into a mold having the form desired and left until it has properly set. It may be then removed from the mold and allowed to harden.

While I do not wish to be limited to any specific proportions for this composition, I have found that for the production of slabs for use for bases for insulating purposes or for imitation marble slabs and the like, approximately the following proportions are advisable, one pound of finely ground lime rock, one pound of magnesite, one-quarter pound of pulverized sulphur, eight pounds of sand, stones, gravel or earth. These, as before stated, are mixed thoroughly together with about one teaspoonful of oil. I do not wish to be limited to any particular character of oil, but in order to overcome the rather disagreeable odor of the magnesium chloride I may use oil such as sassafras oil, as I have found that the fragrance given off by this oil is retained to a considerable extent in the slabs. It will be understood, however, that the oil is not used for giving a fragrance to the slab but has a very vital and specific purpose.

To the ingredients in the proportions above mentioned there is added the solution of magnesium chloride. This solution has a specific gravity of from 18° Baumé to 35°

Baumé, depending entirely on the material used. The higher the specific gravity, the more refractory is the product. For such articles, therefore, as blocks or bricks to be used in the construction of metallurgical furnaces where bricks or blocks must be highly refractory, it is necessary that the specific gravity should be high, as before stated, but a solution having a relatively low specific gravity may be used for articles which are not submitted to high degrees of heat such, for instance, as book ends, sinks, set tubs, bath tubs, and the like.

After the mixture of ingredients has been brought to the consistency of batter or syrup, it is immediately poured into the mold. When it is poured into the mold, the heat engendered by the chemical reaction as, for instance, the slacking of the lime by the water added to the composition raises the heat of the mass to nearly 212° F. and this heat, I have found, acts to bake the mass and to transform the separate materials into one solid, uniform body and that portion of the mass which is immediately in contact with the mold, if the face of the mold is smooth, takes on a very high degree of polish. While the grain of the mass is uniform within certain limits without regard to the materials employed, whether gravel, sand or earth, yet the character of the mass depends somewhat upon these materials. Thus, for instance, it is possible to imitate marble by introducing into the aggregate formed as described nodules of agate or like material and these nodules will apparently fuse or become otherwise transformed in the mass and amalgamate with it in the form of streaks or markings upon the highly polished surface of the mass where it comes in contact with the mold which will very closely simulate marble. The mass is left in the mold from one-half to three-quarters of an hour before the heating effect starts and the mass is left in the mold usually for about four hours. At the end of four hours it has cooled sufficiently so that it may be taken out without any tendency to warp and when thoroughly cooled the article is refractory to a high degree, is electrically non-conductive, is waterproof and at the same time is extremely resistive to crushing or breaking strains.

Coloring pigments are, of course, intended to be mixed with the mass at the time when the materials are being intermingled with each other and this pigment will give to the mass any desired color. Without the pigment the article will be usually white but the article may be colored black, pink, yellow or any other desired color, and I have found that in actual practice this color does not fade or otherwise deteriorate but is retained throughout the life of the article itself.

Furthermore, this article so made is not absorbent after once it has cooled and hardened and, therefore, will not stain. This makes it particularly desirable for use in the construction of bath tubs, drainboards, sinks, set tubs and toilets. The artificial stone may be used for constructing all these articles and also bricks and slabs simulating marble or bricks or slabs which are to be used in metallurgical furnaces and electrical furnaces where they are subjected to a very high degree of heat. The articles constructed in accordance with my invention have been tested at the Pittsburgh testing laboratory both as regards their ability to withstand heat and crushing, their imperviousness to water, the electrical non-conductivity, and as regards the action of brine thereon, the last test being to determine the usefulness of pickle and brine tubs formed of this material. During this test the bricks or slabs were soaked twenty-four hours in brine and then subjected to a temperature of 4203° F. and at the same time were subjected to a crushing pressure up to 4500 pounds to the square inch, when the bricks or blocks being tested gave away. Tests showed that the bricks were thus extremely refractory and at the same time would sustain a very high crushing pressure, and further tests showed that they were not absorptive and that their non-conductivity was very high.

Furthermore, products of this character have been disposed within a cupola furnace, taking the place of ordinary brick, and it has been found that they will stand far greater heat than ordinary refractory brick and will last longer. This is for the reason that the ordinary bricks between each heat absorb moisture and this moisture is then dispelled when the bricks are subjected to high heat and this alternate absorption and expulsion of moisture tends to very greatly shorten the life of the bricks or blocks. By reason of the oil within my brick, however, the absorption of water is entirely prevented, and obviously this same non-absorptive quality is particularly desirable where the artificial stone is used for the making of bath tubs, sinks, toilets, etc. This artificial stone is particularly capable of use for the last named purposes by reason of the fact that the surface of the artificial stone which is adjacent the mold, assuming that the mold has a smooth and polished surface, will also be highly polished and smooth without requiring any further smoothing or polishing.

In place of sand, earth, gravel and like mineral bases, I have found that sawdust may also be used combined with magnesite, pulverized sulphur, lime, magnesium chloride, and oil, and that the resultant product while, of course, not having the hardness, resistance or certain qualities of the slabs or bricks formed with a mineral base, has this hardness and tenacity to a considerable degree but coupled with a relatively light weight which particularly fits this composition for the formation of book ends, vases, etc., and has a particularly high non-conductiveness.

Artificial stone constructed in accordance with my invention is adapted particularly for the making of book ends, bricks, blocks, paving blocks, sinks, set tubs, bath tubs, toilets, slabs upon which to mount electrical instruments, bases for switches, etc. The slabs made of sawdust are also particularly adapted for the making of desk tops and other light objects and will stand a pressure of approximately 2200 pounds. These slabs may be cut by means of a saw and nailed together.

The slabs or other articles made with a mineral base, such as sand, earth, etc., may also be sawed or otherwise worked immediately after the articles have been removed from the mold when they are still relatively soft, though sufficiently hard not to warp or change their shape.

I regard the sulphur as particularly important and I have found that without the sulphur this artificial stone will not have the qualities which I particularly desire. Without sulphur the stone would shrink when placed in the mold, whereas with the sulphur the article after it has cooled has exactly the same size as the mold. Thus there is no danger of the article shrinking and becoming deformed during the casting process. Furthermore, the sulphur holds the heat in the mass and assists, therefore, in the baking and acts to prevent expansion or contraction when the mass is poured into the mold. I have further found that without the sulphur the mass is very brittle.

The importance of the oil has also been heretofore adverted to, as it is the oil which prevents the mass from becoming absorptive and this quality of non-absorption conduces to the long life of the article, particularly where it is submitted to alternate heat and cold.

While I have heretofore referred to this material being used in slabs or blocks or articles having a relatively large bulk, I have found in practice that it may also be made into sheets of considerable thinness, which sheets will not warp or otherwise change their shape. I have found that without the oil, however, these very thin sheets would be liable to warp. It is obvious that this material may be used for forming phonographic records or other relatively thin plates, and it has been found in practice that these thin plates, sheets and slabs are not brittle and have none of the highly fragile qualities of thin sheets or slabs made of ordinary artificial stone or made from the materials heretofore mentioned omitting the sulphur.

One of the advantages of this invention lies in the fact that objects may be molded upon metallic shanks, the objects being made of my artificial stoneware, and the heat which is generated by the chemical action of the ingredients, while sufficient to bake the product and solidify it, will not affect in any way the metallic shank. The artificial stone which I have described may be made to imitate onyx, agate, marbles of all kinds, and a large number of different materials by changing the pigment used with the mass, and thus the knobs before referred to may be made of a highly ornamental character with any desired design formed thereon and at the same time secure engagement between the knob and the shank.

I do not wish to be limited to the exact ingredients stated, as these might be changed in many ways without departing from the spirit of the invention, and particularly with regard to the use of the magnesium chloride, as solutions of other chlorides might be used as, for instance, chloride of strontium, chloride of barium, bisulphide of ammonium or equivalent ingredient such as sulphate of magnesia and sulphate of aluminum. My experience, however, has shown me that the best results are obtained with the magnesium chloride.

I claim:—

1. An artificial stone of the character described including a finely comminuted base, lime, magnesite, sulphur, and magnesium chloride.

2. An artificial stone including a finely comminuted base, lime, magnesite, sulphur, magnesium chloride, and oil.

3. An artificial stone including finely pulverized lime rock, magnesite, pulverized sulphur, a finely comminuted base, magnesium chloride, and oil.

4. A method of making artificial stone which consists in intimately mixing a finely comminuted base, finely comminuted lime, magnesite, and sulphur, intimately mixing these materials with a solution of magnesium chloride, and adding thereto an oil.

5. A method of making artificial stone which consists in intimately mixing a finely comminuted base, finely comminuted lime, magnesite, pulverized sulphur, and oil, and while the ingredients are being intermingled with each other adding thereto a solution of magnesium chloride having a specific gravity of from 18° to 35°, pouring the mass into a mold and allowing it to bake by the chemical reaction between the ingredients, leaving the mass in the mold until it has cooled to a predetermined degree, and then removing the mass from the mold.

6. A method of making artificial stone which consists in intimately mixing lime rock, magnesite, pulverized sulphur, a finely ground base, a solution of magnesium chloride, an oil, pouring the composition into a mold, allowing the chemical reaction between the ingredients to bake the mass, and then removing it from the mold.

7. An artificial stone including the following ingredients in the following proportions, a finely ground mineral base eight pounds, finely ground lime rock one pound, finely ground magnesite one pound, finely pulverized sulphur one-quarter pound, magnesium chloride having a specific gravity of from 18° to 35°, and a relatively small amount of oil.

8. An artificial stone of the character described including a finely comminuted base, sulphur, a solution of chloride, and finely comminuted materials which, when mixed in the presence of a liquid, will generate heat.

9. An artificial stone of the character described including a finely comminuted base, lime, magnesite, sulphur, a chloride, and an oil.

10. A method of making artificial stone which consists in intimately mixing a finely comminuted base, finely comminuted sulphur, a solution of a chloride, and baking these materials by mixing therewith finely comminuted materials which will react with the liquid to generate heat.

In testimony whereof I hereunto affix my signature.

CHARLES F. CHRISTIAN.